United States Patent [19]
Laird

[11] Patent Number: 5,781,157
[45] Date of Patent: Jul. 14, 1998

[54] MULTIPLE BEAM RADAR SYSTEM WITH ENHANCED SIDELOBE SUPRESSION

[75] Inventor: James G. Laird, Laguna Beach, Calif.

[73] Assignee: McDonnell Douglas Corporation, Huntington Beach, Calif.

[21] Appl. No.: 693,907

[22] Filed: Aug. 5, 1996

[51] Int. Cl.⁶ .............................. G01S 3/16; G01S 13/00
[52] U.S. Cl. ................................ 342/379; 342/156
[58] Field of Search .......................... 342/156, 379, 342/452, 380, 373, 157, 368

[56] References Cited

U.S. PATENT DOCUMENTS

| | | | |
|---|---|---|---|
| 3,325,818 | 6/1967 | Dutton | 342/379 |
| 4,827,270 | 5/1989 | Udagawa et al. | 342/373 |

*Primary Examiner*—Gregory C. Issing
*Attorney, Agent, or Firm*—Bell Seltzer Intellectual Property Group of Alston & Bird, LLP

[57] ABSTRACT

A radar system (25) includes a transmitter (42), receiver (48) and a phased array antenna (28) composed of a plurality of subarrays (26). The transmitter is interconnected with certain laterally located subarrays (34, 36, 38, 40) of the antenna and other centrally disposed subarrays (30, 32). The subarrays (26) are interconnected via beam formers (46) to a multi-channel receiver (48) providing a radar system having multiple beams with enhanced sidelobe suppression. Another version steers the transmit beams by applying linearly varying phase functions (56) combined with fixed increasing or decreasing phase functions (57) to antenna array radiators(55).

11 Claims, 10 Drawing Sheets

Azimuth, ln (Wavelength / Length) radians

MULTIPLE BEAM RADAR SYSTEM WITH ENHANCED SIDELOBE SUPRESSION

BACKGROUND

1. Field of the Invention

The present invention relates generally to a radar system, and, more particularly, to a multiple beam radar system for achieving high angular resolution and minimized scanning time while at the same time enhancing suppression of sidelobes.

2. Description of Related Art

It is well known that narrowing a radar beam will increase the angular resolution capabilities of the beam which, if nothing more is done, at the same time increases the scan frame time required to cover a given region of interest in a search radar system, for example. One approach taken in the past to reduce scanning time while maintaining high angular resolution has been to use an antenna array consisting of a binary number of subarrays connected to a Butler Matrix which will produce multiple receive beams spaced by $\lambda/L$ radians within the broad subarray pattern, where $\lambda$ is the radio frequency (RF) wavelength and L is the length of the receiver array. These beams overlap adjacent beams at their 3.9 dB points. If two transmitting antenna subarray sections are added whose phase centers are located at the two ends of the receiver array, interferometric action will produce multiple narrow lobes conforming to the "$\cos(\pi L\sin(\phi)/\lambda)$" equation, which are spaced by $\lambda/L$, where L is the length between transmit beam centers, and aligned with the receive beams from the Butler Matrix. Each of these beams overlap adjacent beams at the 3.9 dB points. Where two transmitting antenna subarray sections are added whose phase centers are located at the two ends of the receiver array, interferometric action will produce multiple narrow beams conforming to the "$\cos(\pi L\sin(\phi)/\lambda)$" equation, which are spaced by $\lambda/L$, where L is the length between transmit beam centers, and aligned with the receive beams from the Butler matrix. The addition of the two end arrays increases the total array length from, say, sixteen to eighteen subarrays. Thus, if L represents the total array length, the receiver array length becomes "$(16/18)L$" and the multiple beams spaced by "$(9/8)\lambda/L$" radians.

Although such a system configuration has been found to improve resolution as a result of the relatively narrow interferometer lobes created, there is, however, at the same time an undesirable increase in sidelobes due to the overlap of each receive beam with the adjacent transmit lobes. These sidelobes cannot be lowered by known techniques such as so-called "receive weighting", for example, because weighting will broaden the receiver main lobe and increase the overlap with adjacent transmit lobes. Accordingly, such a system is not fully satisfactory and it is a desideratum to obtain a radar system having both high angular resolution and presenting minimal sidelobe difficulties.

SUMMARY OF THE INVENTION

For use in practice of the present invention a single face antenna array consisting of multiple subarrays is interconnected in a radar system. In addition to two transmitting sections, of two subarrays each, located at each end of the multiple subarray antenna, whose phase centers are co-located with the ends of the multiple subarray receive section, a third transmitting section is placed in the exact center of the overall array. In this configuration, all of the subarrays, except the subarray at each end of the array, are connected to a Butler Matrix beam former. There are six subarrays utilized for transmission, two at each end of the array and two in the center. The endmost subarrays are only used for transmission while the other four transmitting subarrays are also part of the receiver subarray section.

When the three transmit sections are fed in phase by the transmitter, transmit lobes are generated by interferometric action spaced apart a distance $2\lambda/L$, where L represents the receiver section length, and a minor lobe located between them in accordance with the equation "$|1+2\cos(\pi L/\lambda\sin(\phi))|/3$". These transmit lobes align with alternate available receive lobes from the Butler Matrix, thus, to obtain the same amount of simultaneous two-way beams, one must deviate from the subarray beam center by twice as far. To avoid excessive gain loss from the subarray beam pattern, the number of radiators per subarray is cut in half and the number of receive subarrays doubled, reducing the receive gain loss due to the subarray pattern. By feeding the transmit sections in phase, a lobe is generated at beamcenter and equally supports overall an odd number of receive beams. Enhanced action is obtained for an even number of receiving channels when the center transmit section is phase inverted from the end sections creating the interferometer function of "$|1-2\cos(\pi L/\lambda\sin(\phi))|/3$".

DESCRIPTION OF A PREFERRED EMBODIMENT

It is well known that when a radar system has been provided with a relatively narrow beam width for the purpose of achieving a correspondingly high angular resolution to reduce clutter and to enable the detection of closely spaced apart targets, for example, that it is desirable to simultaneously operate with more than one such antenna beam and receiver channels (e.g., eight) in order to keep the scan time required to cover the region of interest within reasonable limits. Unfortunately, a dual interferometer of this kind although producing both multiple beams and beam width sharpening, also provides undesirably high angular sidelobes which increase clutter power and reduce system accuracy. Moreover, conventional receiver "weighting" techniques, which are so usefully applied to a single beam radar system for reducing sidelobes, if attempted for a dual interferometer arrangement have been found to actually cause the peak sidelobe amplitude to increase.

Figure 1:
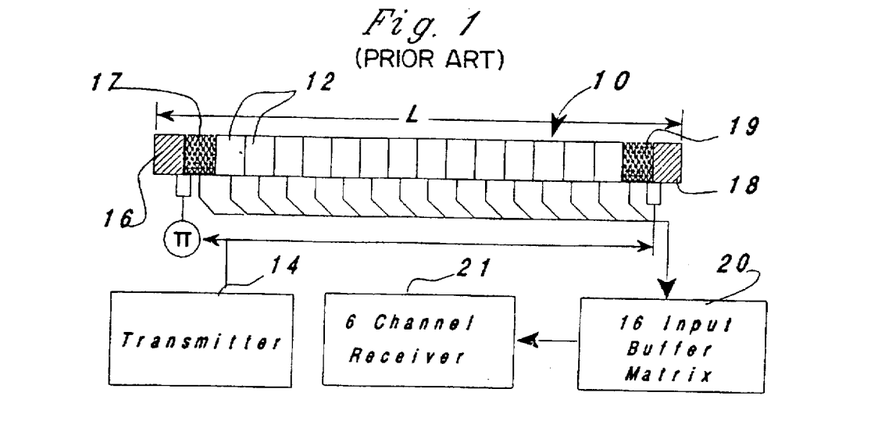
FIG. 1 is a schematic circuit description of a multiple beam radar system of the prior art showing an 18 subarray antenna with the 16 innermost subarrays connected to a Butler Matrix beamformer and the 2 subarrays at each end connected to the transmitter.

Still further in this connection and with reference particularly to FIG. 1 of the drawing, there is shown a typical phased array antenna 10 consisting of eighteen subarrays 12 with a total array length of L. The sixteen center subarrays 12 are arranged to provide a receive antenna array of length (8/9)L. For producing a prior art dual system, a radar signal derived from a suitable radio frequency transmitter 14 is applied solely to two pairs of adjacent subarrays 16, 17 and 18, 19 on the opposite ends of the eighteen subarray antenna. The two shaded subarrays 16 and 18 located beyond the receiver section at the outer opposite antenna lateral edges, are used for transmit only while the immediately adjacent cross-hatched subarrays 17 and 19 are used for both transmit and receive. Accordingly, the phase center of each transmit section, consisting of two subarrays, is located at the ends of the 16 subarray receiver section and also spaced by (8/9)L.

In the receive mode, a collimated signal from each of the sixteen center subarrays 12 is applied to a multiple beam forming network such as a Butler Matrix 20 which is a radio frequency Fast Fourier Transform (FFT). Alternatively, the receive signal may be applied to individual beam formers (not shown), that create multiple receive beams spaced apart by $(9/8)\lambda/L$ radians, where $\lambda$ is the wavelength of the radiated RF signal and L is the width, or length, of the full antenna. Interferometric action between the radiated patterns from the two separated transmitting sections produces multiple beams within the wide mainlobe pattern of the individual transmit sections. The shape of these multiple beams conforms to a sine function and are spaced apart by $(9/8)\lambda/L$ radians, matching the receive beam spacing. It is also necessary that the radiation pattern from each transmitter section overlap all of the receive beams that are to be used in order to simultaneously operate with the desired number of multiple beams.

Figure 2A:
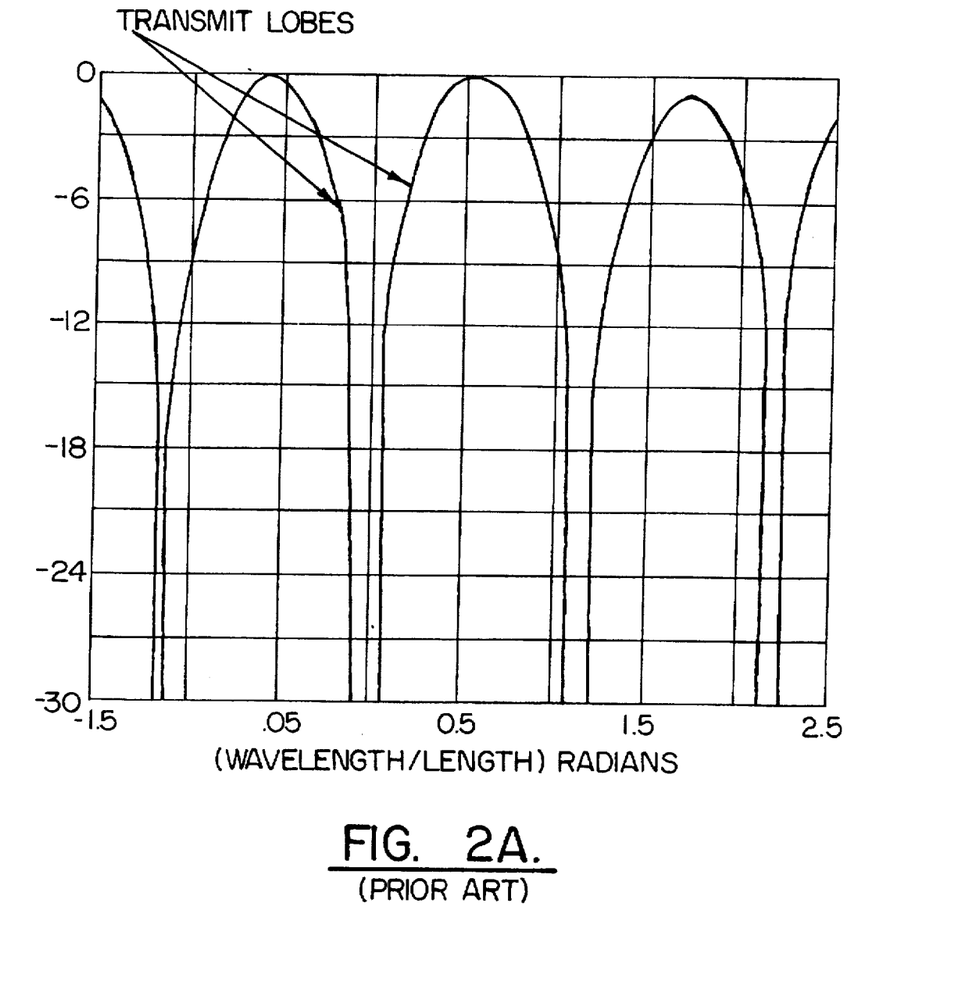
FIGS. 2A–2C are graphs of the antenna patterns obtained with the FIG. 1 configuration showing the overlap between one of the receive patterns and the closely spaced multiple transmit lobes, providing a two-way pattern with a narrow beam and 13 dB sidelobes.
Figure 2B:
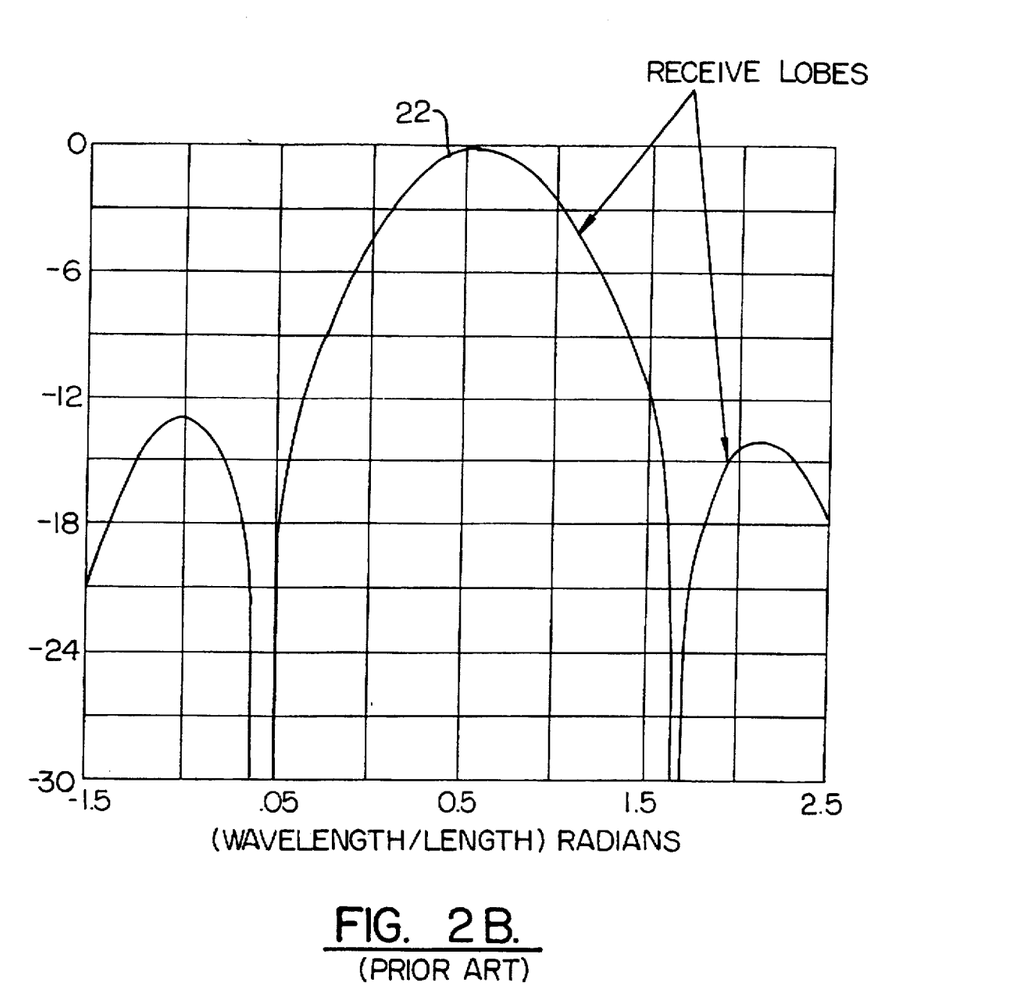
Figure 2C:
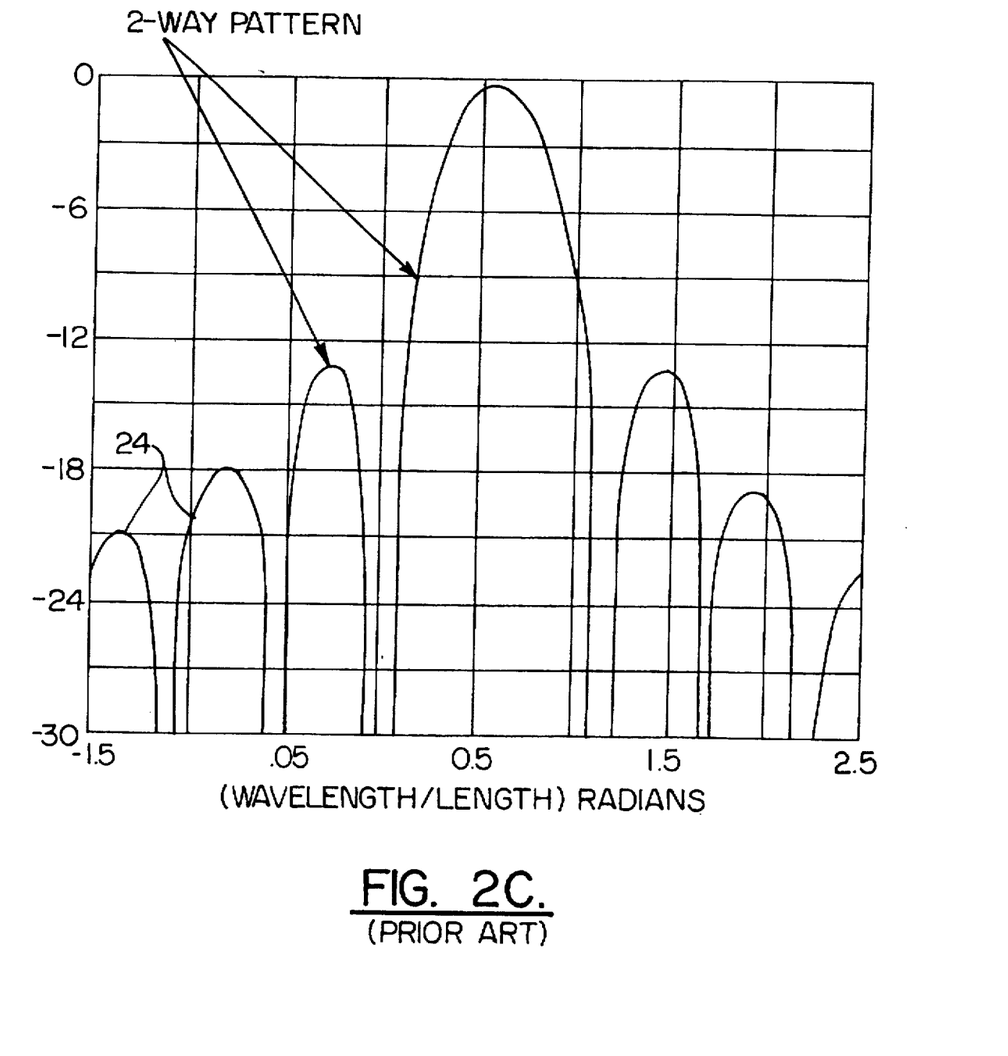

FIGS. 2A–2C show the multiple receive beams 22 that are produced by Butler Matrix 20, the multiple transmit lobes 23 and the resulting two-way pattern generated by the product of this receive beam and the interferometric transmit lobes 24. The receive pattern conforms to a $\sin(\chi)/\chi$ function with a 3.9 dB beamwidth of $(9/8)\lambda L$ radians and 13 dB peak sidelobes. The two-way pattern for this specific beam exhibits a narrow beam width, due to the transmit lobe, and more closely spaced sidelobes created by the interaction of the receive beam's mainlobe and sidelobes with the multiple transmit lobes. Normally, sidelobes are reduced by "weighting" the subarray inputs to the beam former as you would to any FFT, however, the beam broadening produced by weighting also increases the overlap between the receiver mainlobe and the adjacent transmit lobes. This larger overlap results in an increase of the amplitude of the peak sidelobes instead of reducing them.

Figure 3:
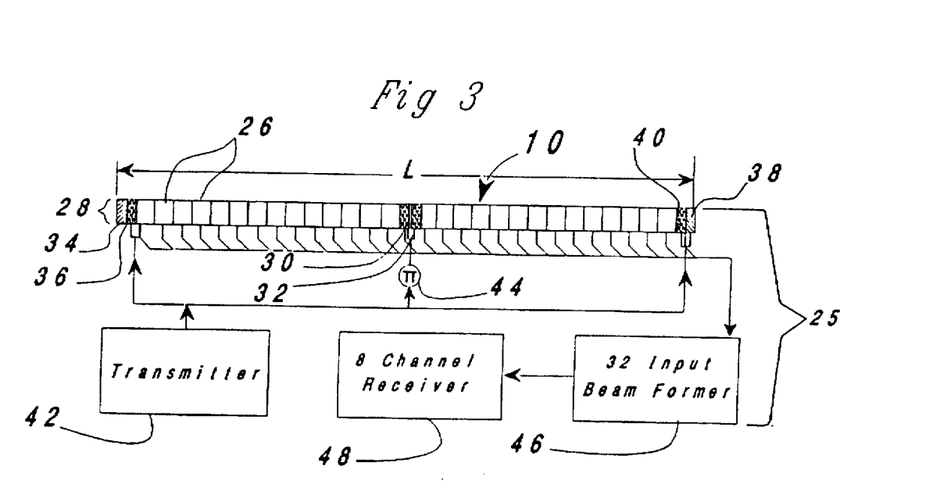
FIG. 3 is a schematic circuit depiction of a multiple beam radar system of the present invention according to a first embodiment.

A primary aspect of the present invention is the replacement of the dual interferometer system of FIG. 1 with a triple interferometer system, schematically depicted in FIG. 3 and enumerated generally as 25. As shown there, a plurality of subarrays 26 of antenna elements are arranged generally to form a phased-array antenna 28. The two adjacent centrally located subarrays 30 and 32 and the two outermost edge subarrays at opposite antenna edges, namely, subarray pairs 34, 36 and 38, 40 are the only subarrays interconnected with a transmitter radio frequency energy source 42, and accordingly are the only subarrays that operate in the transmission mode. More particularly, for reasons which will be given later, the RF energy provided to the central subarrays 30 and 32 are phase inverted by $\pi$ radians in a phase shifter 44 with respect to the energy supplied to the two outer transmit sections.

The antenna 28 is shown composed of thirty-four subarrays, with all subarrays, except the two outermost subarrays 34 and 38, being interconnected to function in the receive mode. Specifically, these thirty-two center subarrays are interconnected with a beam former 46 which accepts thirty-two signal inputs and produces a multiple number of beams for handling by a multiple channel receiver 48. If "L" is designated as the overall length of the thirty-four subarrays, the length of the thirty-two subarray devoted to the receive function and the spacing between the phase centers of the two outer transmit sections will be "(16/17)L".

Figure 4A:
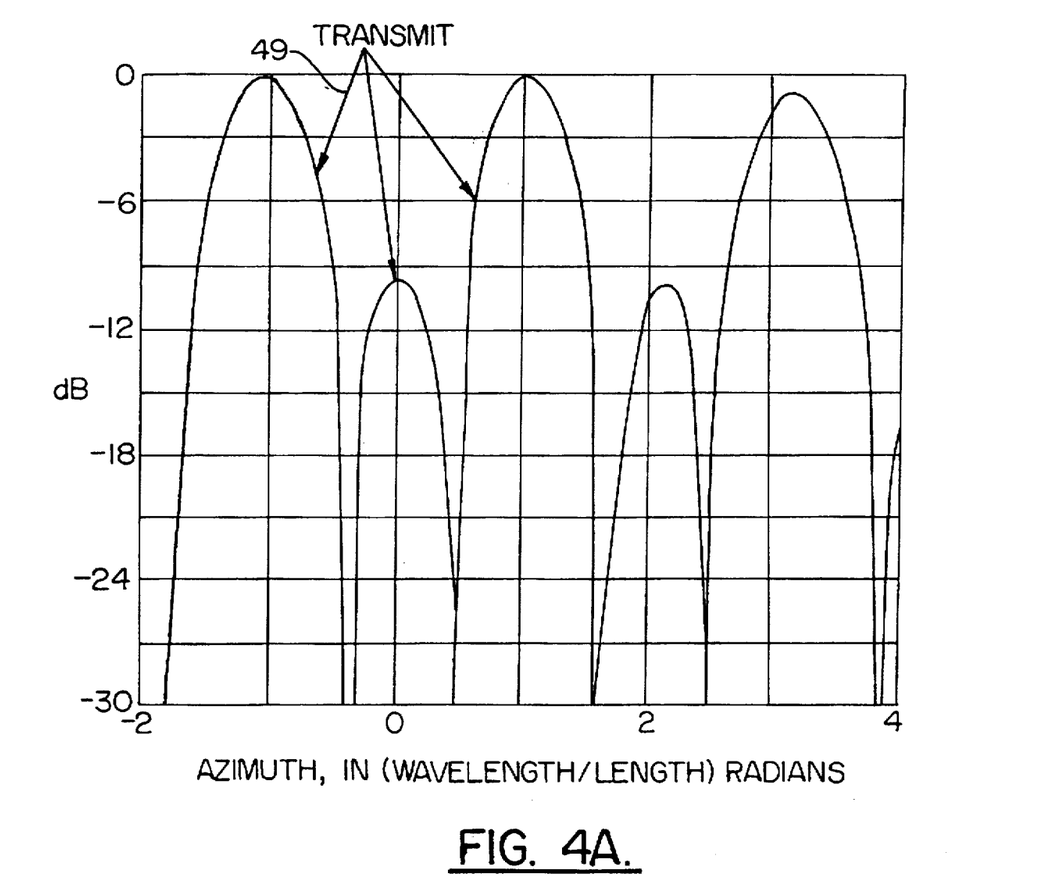
FIGS. 4A–4C are graphical representations of a multiple lobe transmit pattern with $\lambda/L$ spacing and one of the multiple receive patterns for the system of FIG. 3 as well as the resulting two-way pattern.
Figure 4B:
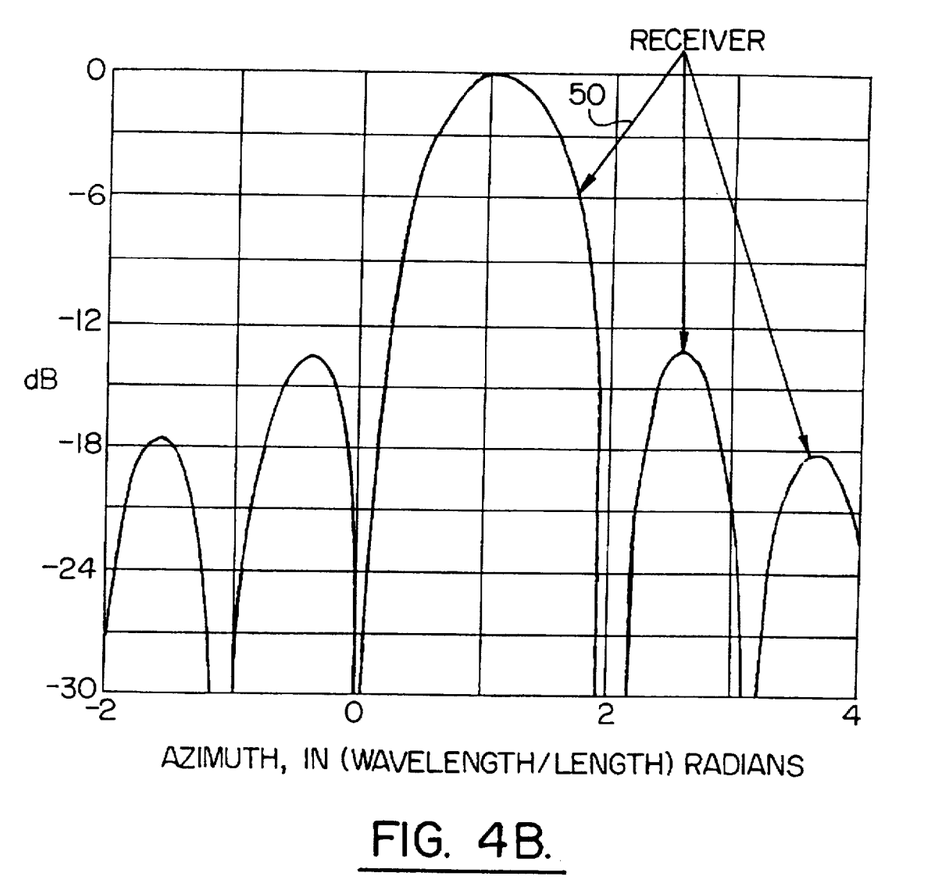
Figure 4C:
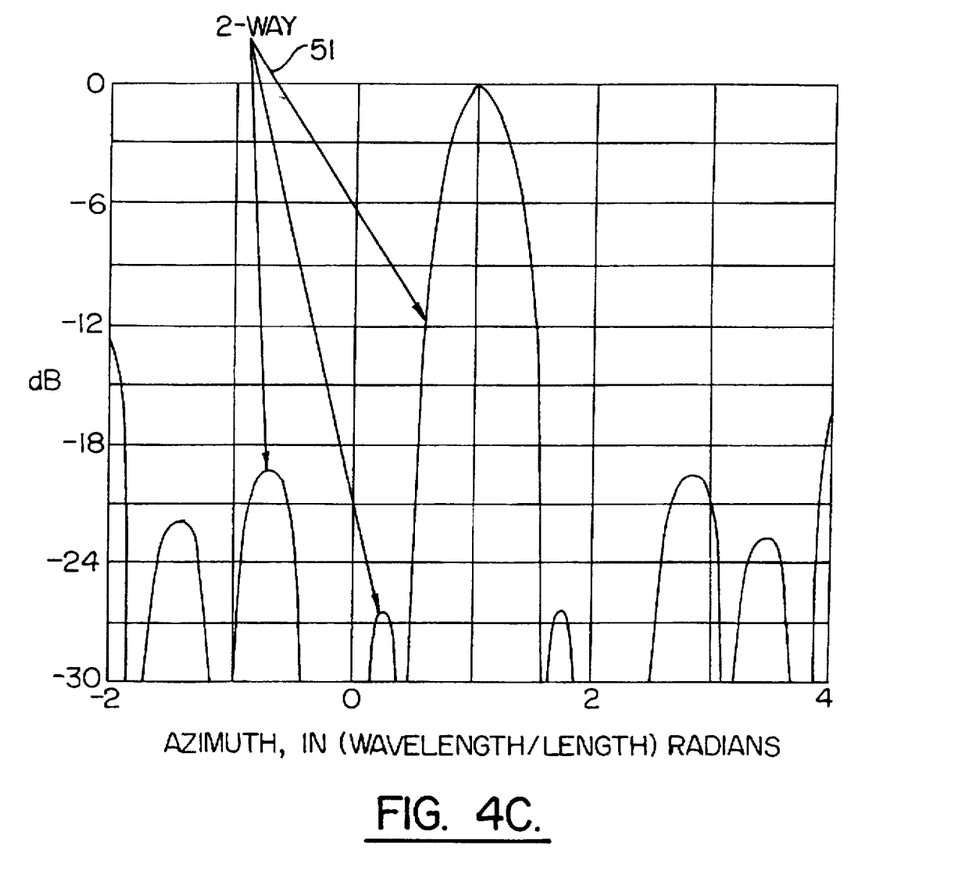

FIGS. 4A–4C show some of the multiple transmit lobes, a selected receiver lobe and the resulting two-way pattern created by the system of FIG. 3. The interferometric transmit lobe pattern conforms to the voltage equation of $\{1-2\cos|\pi (16/17)(L/\lambda)\sin(\phi)|\}/3$ creating multiple lobes spaced by $2(17/16)\lambda/L$ radians whose peak amplitudes conform to the individual transmit section's pattern. These lobes will be located at plus-or-minus 1,3,5,7 etc. times $(17/16)(\lambda/L)$ radians from array normal and indicated as 49. The receiver patterns available from the Butler Matrix are spaced by $(17/16)\lambda/L$ radians starting at array normal with peak amplitudes modified by the single subarray's pattern. Many outputs are available from the Butler Matrix, but only those corresponding to the transmit lobe locations are utilized. The receiver lobe at $+(17/16)(\lambda/L)$ radians only is shown as 50 in dashed lines, the other lobes having a similar shape only located at the position of other interferometer lobes. The two-way pattern generated by these transmit and receive patterns is presented as a wide solid line 51. The first sidelobes are 26 dB down instead of only 18 dB as noted in the Dual Interferometer example. However, the further out sidelobes are only slightly lower. A light weighting function will greatly suppress the further sidelobes and only slightly raise the first sidelobes, producing a multiple beam system with beamwidth improvement and acceptable sidelobes.

As already noted, increasing the number of beams being simultaneously transmitted either reduces the time to cover a given area, or, alternatively, enables expanding the search area when compared to a system utilizing a single search beam. To increase the number of interferometer beams still further, the beamwidth of the transmit arrays has to be increased. Concomitantly, reducing the length of a transmit antenna array to broaden the beam causes a decrease in antenna gain, and, where solid-state technology is used the number of transmit modules is reduced with a corresponding reduction in transmit power. A previously employed method of expanding the beamwidth of a transmit array section has been to superimpose a parabolic phase function on the azimuth steering phase sent to the different antenna radiators. A simpler and more effective technique is given here which utilizes intermediate frequency (IF) techniques to broaden receiver IF bandwidths. Half of the array is steered $\lambda/L$ radians clockwise from the desired azimuth direction and the other half steered $\lambda/L$ radians counterclockwise. The effect is a widened azimuth beam similar to a broadened double-tuned IF circuit.

Figure 5:
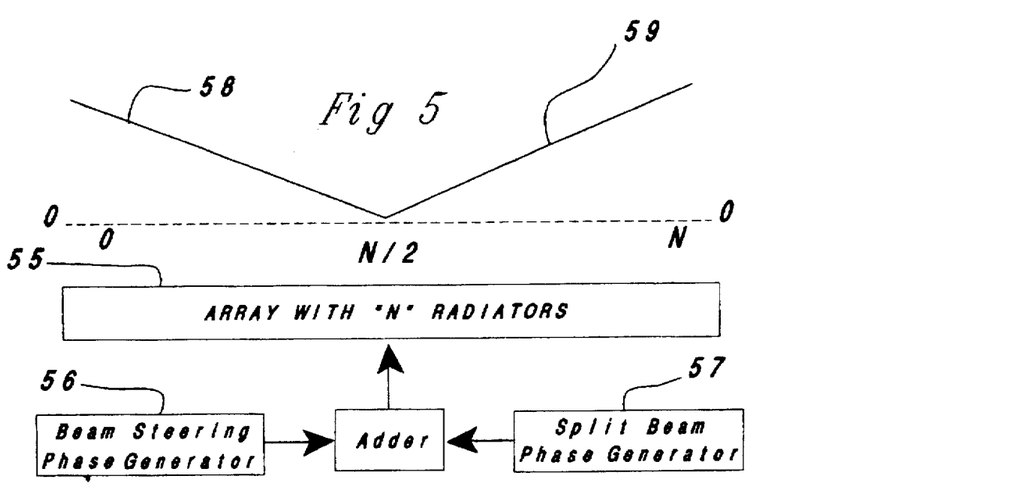
FIG. 5 is a schematic depiction of triple interferometer radiation with split-steering.
Figure 6:
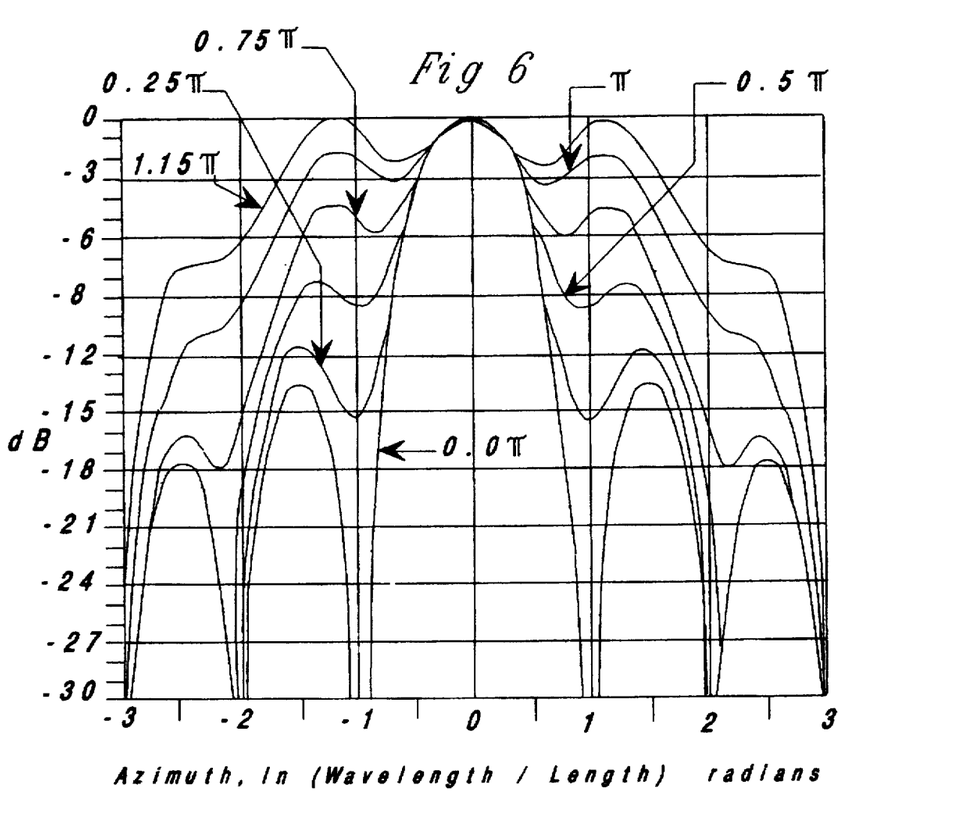
FIG. 6 shows in graphical form the effect of split-beam tuning.
Figure 7:
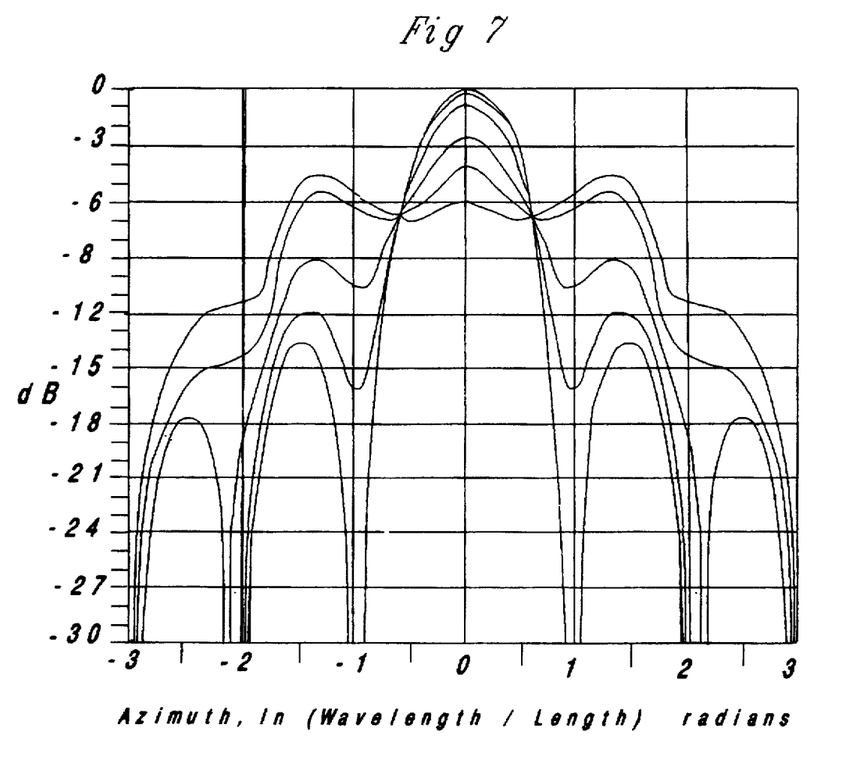
FIG. 7 is a radiation pattern showing amplitude reduction with broadening achieved by split steering or tuning of antenna array.
Figure 8:
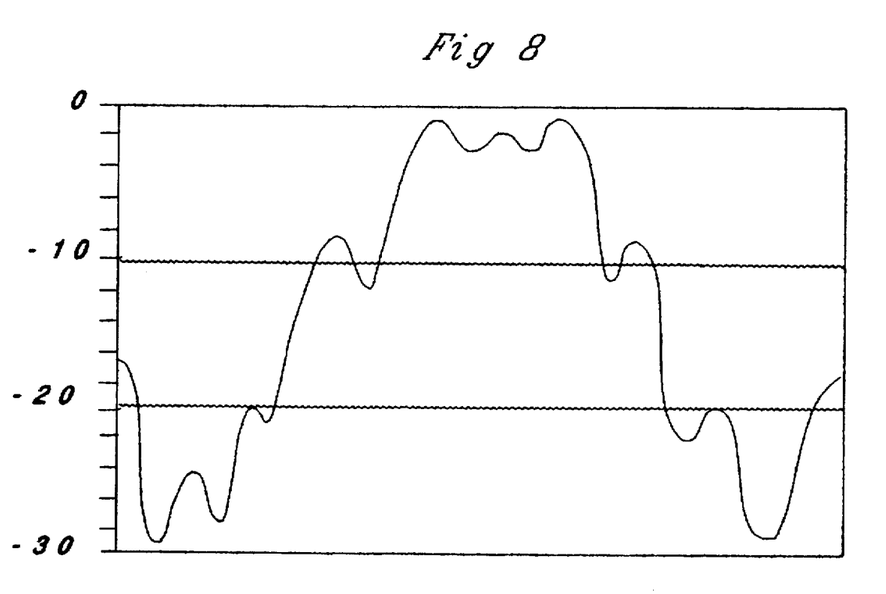
FIG. 8 is a graphical depiction of multiple transmission lobes produced by the system of FIG. 3 when operated with the beamwidth of the transmit sections broadened by a steered beam technique.

For the ensuing detailed description of the split-steering aspect begun in the preceding paragraph, reference is made to FIG. 5. As shown there, a phased array antenna 55 is steered by applying a linearly increasing (or decreasing) phase function to phase shifters typically associated with each of the array radiators. By combining this linear set of beam steering phase commands from generator 56 with a fixed decreasing phase function from a split-beam phase generator 57 varying from π to zero radians over the first half of the array and a like increasing function over the last half of the array, two coherent slightly angularly offset beams 58 and 59 are produced. The composite antenna pattern so created as applied to a triple interferometer beam as earlier described herein is depicted in FIG. 6 for different steering angle amounts (e.g., 1.15π), and the corresponding change in antenna gain can be seen in FIG. 7. The optimum configuration is believed obtained with a "V" phase shape of approximately π radians. When the three transmit arrays of the triple interferometer described earlier herein are widened by split-steering, the resulting radiation pattern contains many more lobes as generally depicted in FIG. 8.

Although the present invention is described in connection with a preferred embodiment, it is to be understood that one skilled in the art may effect changes that come within the spirit of the invention as disclosed and within the ambit of the appended claims.

What is claimed is:

1. A system for use with a radar apparatus for producing multiple narrow transmit beams with reduced sidelobes including a transmitter and a multi-channel receiver, wherein said system comprises:

a phased array antenna for transmitting and receiving radar signals wherein said phased array antenna comprises:

a plurality of subarrays for transmitting and receiving radar signals, wherein said plurality of subarrays includes reception subarrays configured to only receive radar signals, transmission subarrays configured to only transmit radar signals and transmission/reception subarrays configured to both transmit and receive radar signals, said plurality of subarrays arranged such that said phased array antenna includes;

a first antenna section including a transmission subarray and a transmission/reception subarray;

a second antenna section including a transmission subarray and a transmission/reception subarray;

a third antenna section including at least two transmission/reception subarrays, wherein said third antenna section is located intermediate said first and second antenna sections, such that said first, second, and third antenna sections have equal length and phase centers which are equally spaced;

transmitter connecting means for interconnecting the transmitter with the transmission subarrays and the transmission/reception subarrays of the first, second, and third antenna sections such that the resulting transmission pattern generated by said antenna sections includes multiple narrow transmission interferometer lobes;

phase inversion means connected to the transmission/reception subarrays of the third antenna section and the transmitter connecting means for inverting a transmission signal to said transmitting and receiving subarrays of said third antenna section;

beam forming means connected to the reception subarrays and the transmission/reception subarrays for receiving signals from said reception and transmission/reception subarrays and for forming multiple reception patterns which are different than the transmission pattern; and means interconnecting the beam forming means outputs with the multi-channel receiver.

2. A system as in claim 1, in which said third antenna section is located substantially midway between said first and second antenna sections.

3. A system as in claim 1, in which the beam forming means includes a Butler matrix.

4. A system as in claim 1, in which said beam forming means is connected to each of said plurality of reception subarrays for forming multiple receive beams.

5. A system as in claim 3, in which said plurality of subarrays comprises a binary number of adjacent subarrays interconnected to the Butler matrix, wherein the outermost subarrays connected to the Butler matrix are located to coincide with the phase centers of said first and second antenna sections.

6. A system for use with a radar apparatus for producing multiple narrow transmit beams and two-way patterns with reduced sidelobes including a transmitter and a multi-channel receiver, wherein said system comprises:

a phased array antenna having a plurality of individual radiator antenna elements which form a plurality of subarrays and including first, second, and third antenna sections of equal length and phase centers of the sections being equally spaced, said third section being located intermediate the first and second antenna sections;

means interconnecting the transmitter with each of the antenna section subarrays;

phase inversion means connected between the antenna third section subarrays and the transmitter interconnecting means;

first and second steering means connected to the radiator antenna elements of said first, second, and third antenna sections, wherein said first and second steering means provide a decreasing phase function to one half of the radiator antenna elements of the first, second, and third antenna sections for clockwise steering of a first transmission beam and further provide an increasing phase function to the other half of the radiator antenna elements of the first, second, and third antenna sections for counterclockwise steering of a second transmission signal such that two coherent transmission beams which are angularly offset from each other are transmitted thereby increasing the number of beams transmitted;

beam forming means having an input interconnected with a certain plurality of antenna subarrays; and means interconnecting the beam forming means outputs with the multi-channel receiver.

7. A system as in claim 6, in which both the clockwise and counterclockwise steering is 1/L radians from a desired azimuth direction where L is the length of the maximum distance between antenna sections.

8. A system as in claim 6, in which said first steering means includes a first phase generator for providing a linearly changing phase function and said second steering means includes a second phase generator for providing a fixed decreasing phase function and a fixed increasing phase function, wherein the linearly changing phase function is combined with the fixed increasing phase function to clockwise steer said first transmission beam, and wherein said linearly changing phase function is combined with the fixed decreasing phase function to counterclockwise steer said second transmission beam.

9. A system as in claim 8, in which the fixed function varies between 0 and π radians.

10. A method of interferometrically producing more than two transmit radar beams of reduced cross-section without increasing undesirable sidelobe effect, utilizing a radar transmitter, a multi-channel receiver, and phased array antenna, the phased array antenna including a plurality of subarrays which include reception subarrays configured to only receive, transmission subarrays configured to only transmit, and transmission/reception subarrays which are configured to both transmit and receive, wherein said method comprises the steps of:

- selecting a first, second, and third antenna section of the phased subarray antenna, wherein said third antenna section is located intermediate said first and second antenna sections and said first, second, and third antenna sections have equal length and phase centers which are equally spaced, and wherein said first and second antenna sections include one transmission subarray and one transmission/reception subarray and said third antenna section includes two transmission/reception subarrays;
- simultaneously transmitting a transmission signal on the transmission subarrays and the transmission/reception subarrays of said first, second, and third antenna sections;
- phase shifting the transmission signal transmitted in said transmitting step to said two transmission/reception subarrays of said third antenna section such that the resulting transmission pattern includes multiple narrow transmission interferometer lobes;
- receiving reception beams on said reception and transmission/reception subarrays of said plurality of subarrays;
- forming multiple reception patterns from said received reception beams, wherein said formed reception patterns are different than the transmission pattern;
- forming individual receive beams at each antenna subarray; and
- providing said reception patterns to a multi-channel receiver.

11. A method of interferometrically producing more than two transmit radar beams of reduced cross-section without increasing undesirable sidelobe effect, utilizing a radar transmitter, a multi-channel receiver, and phased array antenna, the latter including a plurality of subarrays, comprising the steps of:

- interconnecting the transmitter to three individual equal-length sections of subarrays having their respective phase centers mutually spaced apart wherein one of the sections has its phase center located intermediate the phase centers of the other two sections;
- simultaneously energizing the three antenna section by a transmitter signal;
- shifting the chase of the transmit signal applied to the intermediate section;
- rotating certain transmit subarray beams clockwise while simultaneously rotating the remaining transmit beams counterclockwise;
- receiving reception beams with said reception and transmission/reception subarrays of said plurality of subarrays;
- forming multiple reception patterns from said received reception beams; and
- providing said reception patterns to a multi-channel receiver.

* * * * *

UNITED STATES PATENT AND TRADEMARK OFFICE
CERTIFICATE OF CORRECTION

PATENT NO. : 5,781,157
DATED     : July 14, 1998
INVENTOR(S) : Laird

It is certified that error appears in the above-identified patent and that said Letters Patent is hereby corrected as shown below:

On the title page and column 1, line 2, in the title, "SUPRESSION" should be --SUPPRESSION--.

Title page U.S. Patent Documents "3,325,818" should be --3,325,816--.

Column 8, line 21, "chase" should be --phase--.

Signed and Sealed this

Twenty-ninth Day of September, 1998

Attest:

BRUCE LEHMAN

Attesting Officer     Commissioner of Patents and Trademarks